United States Patent [19]

Arai et al.

[11] 4,130,465
[45] Dec. 19, 1978

[54] TREATMENT OF CARBON FIBERS

[75] Inventors: Kojiro Arai, Okayama; Noriaki Sugai, Fukuoka, both of Japan

[73] Assignee: Japan Exlan Company Limited, Osaka, Japan

[21] Appl. No.: 882,890

[22] Filed: Mar. 1, 1978

[30] Foreign Application Priority Data

Mar. 30, 1977 [JP] Japan .................................. 52-36839

[51] Int. Cl.² ........................ C25D 7/00; C25D 11/00
[52] U.S. Cl. ........................................ 204/27; 204/28; 204/56 R
[58] Field of Search .......................... 204/27, 28, 56 R

[56] References Cited

U.S. PATENT DOCUMENTS

| | | | |
|---|---|---|---|
| 3,175,964 | 3/1965 | Watanabe et al. | 204/37 |
| 3,686,079 | 8/1972 | Masunaga et al. | 204/14 N |
| 3,759,797 | 9/1973 | Masunaga et al. | 204/14 N |
| 3,896,010 | 7/1975 | Vetter | 204/28 |
| 4,050,997 | 9/1977 | Heissler | 204/28 |

FOREIGN PATENT DOCUMENTS 1,297,946  11/1972  United Kingdom ................. 204/56 R Primary Examiner—John H. Mack
Assistant Examiner—William Leader
Attorney, Agent, or Firm—Wenderoth, Lind & Ponack

[57] ABSTRACT

A method of treating carbon fibers in which carbon fibers are supplied into a solution of an electrolyte containing a vinyl monomer, and the carbon fibers are caused to act as the cathode to produce electrolytic reaction in said solution so that the surfaces of the carbon fibers are covered with a polymerization product whereby the ability of the carbon fibers to bundle themselves can be elevated and the adhesiveness between the carbon fibers and resin to be reinforced upon producing carbon fiber composite materials can be improved.

10 Claims, No Drawings

TREATMENT OF CARBON FIBERS

BACKGROUND OF THE INVENTION

1. Field of the Invention

The present invention relates to a method of treating carbon fibers, and more specifically to a method of treating carbon fibers in which carbon fibers obtained by a usual method are supplied into an electrolyte solution containing a vinyl monomer and the carbon fibers are caused to act as the cathode to produce electrolytic reaction in said solution so that the surfaces of the carbon fibers are covered with a polymerization product whereby the ability of the carbon fibers to bundle themselves can be elevated and the adhesiveness between the carbon fibers and resin to be reinforced upon producing carbon fiber composite materials can be improved.

2. Description of the Prior Art

Carbon fibers are noted as a new, useful structural material, and in most cases they are used, embedded in various resins, as a reinforcing support fiber (structural material) for composite materials like the so-called fiber-reinforced plastics (FRP). It is now widely acknowledged that, among many reinforcing fibers of this type, carbon fibers have an especially good reinforcing ability. However, it is also true that several technical problems remain unsolved for carbon fiber composite materials. As fundamental properties required for the composite materials, it is necessary that the carbon fibers and resin to be reinforced (matrix) should adhere intimately to each other and that the resulting structure should be of uniform, homogeneous structure containing no vacant spaces or voids. But, it is difficult to say that, as regards conventional composite materials, the above-mentioned requirements have been always satisfied. Namely, the poor adhesiveness between the two and the presence of voids induce separation of carbon fibers from the matrix, resulting in a severe drop of the physical properties (for example, interlaminar shear stress, flexural strength, etc.) of the composite materials.

Of course, several methods for surface treatment of carbon fibers have been proposed to eliminate such defects of the composite materials. However, all of them still involve unsolved points in order to put them into practice on an industrial scale. Namely, there have been attempted oxidation treatments of carbon fibers including wet oxidation treatment with concentrated nitric acid, and high-temperature gas phase oxidation treatment, etc.; surface covering treatment in which carbon fibers are immersed in a solution containing a high molecular weight substance to cover the filaments with said high molecular weight substance; and whisker-raising method in which single crystals are developed on the surfaces of the carbon fibers. However, in the oxidation methods, there is a disadvantage in that the oxidation reaction proceeds to the internal portions of the carbon fibers, thereby lowering the strength, although some degree of improvement in adhering power is ackowledged; in the surface covering method, a high molecular weight substance is merely adsorbed physically to the carbon fibers, with the covering being not only uneven but also its durability being not satisfactory; and in the whisker-raising method, it is difficult to increase the reaction efficiency and this makes it extremely difficult to bring this method into practice on an industrial scale. In these conventional methods which cause such various disadvantages, it is also attempted to provide a sizing step after treatment in order to increase the ability to bundle the carbon fibers and to improve the adhesiveness between the carbon fibers and matrix. However, since the defects which the carbon fibers have received in the surface treatment step are carried intact into the sizing step, it is technically difficult of course to improve the physical properties of the composite material, even though the sizing step is specially established.

When thus studying the conventional methods as mentioned above, it will be found that a treating means for carbon fibers which can elevate the ability to bundle carbon fibers without providing any sizing step and which, when producing a carbon fiber composite material, can improve the adhesiveness between the carbon fibers and the resin to be reinforced, is a great future technical problem.

STATEMENT OF THE INVENTION

We have tackled this technical problem eagerly, and as a result, we have noted that when carbon fibers are supplied into an electrolyte solution containing a vinyl monomer and the solution is electrolyzed under a condition in which the carbon fibers can act as the cathode, the polymerization reaction of the vinyl monomer will proceed in an extremely short time and the surfaces of the carbon fibers (the cathode) will be uniformly covered with the polymerization product produced from the polymerization reaction, and we have further found that the carbon fibers produced by this surface treatment have an excellent ability to bundle themselves together, without providing any sizing step, and that the carbon fibers thus obtained have very good adhesiveness with the matrix resin. This discovery led to the present invention.

The main object of the present invention is to provide a treating method of carbon fibers which is able to give carbon fiber-reinforced composite materials which are excellent in practical use.

Another object of the present invention is to provide carbon fibers which are able to elevate the adhesiveness with the matrix resin, when producing carbon fiber-reinforced composite materials.

A still further object of the present invention is to provide a treating method which is able to improve the ability of the carbon fibers to bundle themselves together, without employing any sizing step.

Further objects of the present invention will become apparent from the following description of the specification.

The above-mentioned objects of the present invention can be attained by supplying carbon fibers into an electrolyte solution containing a vinyl monomer; causing electrolytic reaction in said solution under a condition such that the carbon fibers in said solution are charged negatively so that the fibers can always act as the cathode; and thus forming a polymerization product on the surfaces of the carbon fibers.

By following this treating method, a polymerization reaction (partly graft polymerization reaction) of the vinyl monomer is caused on the surfaces of the carbon fibers in a very short time and the fibers are covered with a prescribed amount of the polymerization product having an affinity to the matrix, so that carbon fibers having good adhesiveness with the matrix can be obtained in an industrially advantageous manner.

It is also a remarkable feature of the present invention that homogeneous, uniform carbon fiber-reinforced composite materials can be obtained, since the ability of the carbon fibers to bundle themselves together is elevated and therefore the generation of fluffs on the fiber surfaces is suppressed.

Furthermore, in the reinforced composite materials produced with the carbon fibers prepared in accordance with this method, relaxing layers are formed between the carbon fibers (structural material) and the resin to be reinforced (matrix), and this ensures a high degree of impact strength. Accordingly, the reinforced composite materials are suitable for applications such as a body member of airplanes.

DESCRIPTION OF PREFERRED EMBODIMENTS

The carbon fibers used in the present invention include those produced by the usual heat treating methods, and the starting materials (the so-called "precursor") of said fibers can be freely selected from acrylic fibers, rayon fibers and pitch fibers, but the employment of acrylic fibers is particularly preferred to attain the objects of the present invention.

The vinyl monomers used in the treating method of the present invention include acrylic acid, methyl acrylate, ethyl acrylate, acrylamide, acrylonitrile, acrolein, styrene, vinyl pyrrolidone, vinylpyridine and vinyl acetate.

In the present invention, it is important to supply the carbon fibers into an electrolyte solution containing a vinyl monomer and to cause electrolytic reaction in said solution in which the carbon fibers are made to act as the cathode. Explaining the mode of practice more concretely, the carbon fibers which have been charged negatively by any suitable means are supplied into an electrolyte solution containing a vinyl monomer, and an electric current is passed to cause electrolytic reaction in said solution. As the means to charge the carbon fibers negatively, there can be mentioned a method in which the supply roller provided before the treating bath is charged negatively beforehand and the carbon fibers and the roller are contacted to each other; and a method in which an electric current is passed so that the carbon fibers before or in the treating bath are charged negatively. As the means for supplying the carbon fibers into the electrolyte solution, there can be mentioned a method wherein the carbon fibers are continuously passed through the electrolyte solution; and a method wherein the carbon fibers are immersed batchwise into said solution. As regards the amount of vinyl monomer employed in the above-mentioned treatment, it is preferable to maintain it within the range of from 0.1 to 5 volume % based on the total volume of the solution in the treating bath. When the amount of vinyl monomer is less than 0.1 volume %, it is difficult to form a sufficient amount of covering layer of the polymerization product on the surfaces of the carbon fibers. On the other hand, when the amount exceeds 5 volume %, an excess amount of covering layer is formed, thus bringing about unevenness.

In a preferred embodiment of the present invention, it is desirable to add a hydroperoxide compound, for example hydrogen peroxide, methylhydroperoxide, ethylhydroperoxide, etc. to the vinyl monomer-containing electrolyte solution. Among these compounds, the use of hydrogen peroxide is particularly preferred because it shortens the treating time still more and serves to attain the objects of the present invention more advantageously. As regards the amount of hydrogen peroxide, it is suitable to maintain it within the range of from 0.1 to 20 weight % based on the total amount of the electrolyte solution. When the amount is less than 0.1 weight %, the same disadvantage as in the case of the vinyl monomer being less than 0.1 volume % is observed, and when it exceeds 20 weight %, uneven covering results. Of course, the above-mentioned range should be applicable also to methylhydroperoxide and ethylhydroperoxide.

In the above-mentioned electrolytic reaction treatment, the addition of an electrolyte (0.01–5 normal) such as sulfuric acid, sodium hydroxide, ammonium carbonate, sodium phosphate, etc. to the treating solution to increase electric conductivity, the use of a metallic plate such as stainless steel as the anode, and the use of direct current should follow the condition of the conventional electrolytic reaction.

In this electrolytic reaction when using for example hydrogen peroxide, it is reductively decomposed on the cathode (carbon fibers) side to form active seeds (HO. radicals). Such active seeds act as the polymerization initiator, and the polymerization reaction of vinyl monomer proceeds on the surfaces of the carbon fibers. The polymerization proceeds in accordance with the following reaction mechanism:

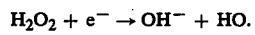

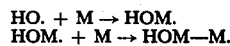

wherein M represents vinyl monomer.

The electrolytic reaction (polymerization reaction) proceeds in this way, and by varying the conditions of reaction time and current density (current per unit area of the carbon fibers) at this time, the covering amount of the polymerization product on the surfaces of the carbon fibers is suitably adjusted. In the present invention, when the covering amount is from 0.5 to 10 weight % based on the weight of the carbon fibers used, such an amount is sufficient to ensure the adhesiveness between carbon fibers and matrix in composite materials. In order to maintain such a covering amount, it is preferable to adjust the reaction time to within 120 seconds and the current density to above 1 A/m$^2$, within the preferred range of vinyl monomer and hydrogen peroxide employed as required. Particularly, a reaction time of 20 to 100 seconds and a current density of 5 to 30 A/m$^2$ are recommended. If the covering amount of the polymerization product is less than 0.5 weight %, the adhesiveness between the carbon fibers and matrix in composite materials is not insured for practical use. On the other hand, when the covering amount exceeds 10 weight %, the surface uniformity of the carbon fibers is impaired.

In this way, carbon fibers which suit the objects of the present invention are obtained. The carbon fibers thus produced are excellent in adhesiveness with a matrix like a resin to be reinforced, and therefore composite materials having very good physical properties can be produced advantageously and uniform composite materials having little variation in physical properties can be obtained. Of course, the effects produced by the present invention are not limited to composite materials like carbon fiber-reinforced plastics (CFRP) which use a resin as the matrix, but the carbon fibers produced according to the present invention are advantageously used in the wide field of reinforcing materials, exothermic elements, refractory materials, etc. as in the case of the conventional carbon fibers. The resins used as the matrix include thermosetting resins such as epoxy resins, phenol resins, unsaturated polyester resins, polyimide resins, etc.; and thermoplastic resins such as nylon resins, polyester resins, polyacetal resins, fluorine-containing resins, polystyrene resins, ABS resins, etc.

For a better understanding of the present invention, representative examples of the invention are shown in the following.

EXAMPLE 1

A bundle of a 3000 filament carbon fiber (tensile strength 290 kg/mm$^2$; tensile modulus of elasticity 24 ton/mm$^2$) obtained by heat-treating an acrylic fiber as the precursor was caused to travel continuously through a bath of the following electrolyte solution.

The electrolyte solution was an aqueous solution of 0.05 N sulfuric acid to which 1 volume % of methyl acrylate and each amount of hydrogen peroxide shown in Table 1 had been added. Using the carbon fibers as the cathode (which was charged by connecting the carbon fibers to the negatively charged supply roller positioned before the treating bath) and a stainless steel plate as the anode, a direct current having a current density of 16 A/m$^2$ was passed, and the electrolytic reaction was caused to proceed for each treating time shown in Table 1. After the completion of the reaction, the treated fibers were washed with water and dried.

The weight increase ratios of the thus-obtained fibers are shown in Table 1.

Table 1

|  |  | Concentration of hydrogen peroxide (wt %) | Treating time (seconds) | Weight increase ratio (%) |
|---|---|---|---|---|
| Present invention | A | 0 | 90 | 1.5 |
|  | B | 1 | 30 | 2 |
|  | C | 2 | 30 | 3 |
|  | D | 5 | 30 | 8 |
| Comparative examples | E | 2 | >150 | 13 |
|  | F | 3 | >150 | 14 |

It will be understood from Table 1 that, by employing the suitable treating condition of the present invention, it is possible to advantageously produce carbon fibers having the desired amount of covering and accordingly capable of providing excellent composite materials.

Composite materials were prepared from the above-mentioned carbon fibers (A, C, D and F) and untreated carbon fibers, and their physical properties were evaluated: The five kinds of carbon fibers were each arranged in parallel in one direction and were immersed into a mixed liquid composed of 100 parts of an epoxy resin (Epikote ® 828, Shell Chemicals Corp.), 5 parts of boron trifluoride monethylamine (BF$_3$MEA) and 30 parts of methyl ethyl ketone, and were brought into a semi-solidified state at 120° C. to form 5 kinds of prepregs. The prepregs were laid in layers in a metallic mold and were shaped under pressure for 30 minutes at 180° C. Thereafter, they were hardened in the usual way and 5 kinds of one-direction reinforced laminates containing 58 volume % carbon fibers were obtained. The interlaminar shear stress and flexural strength of these 5 kinds of laminates and the strand tensile strength of the 5 kinds of the treated carbon fibers were measured. The results are shown in Table 2. The measurement of the interlaminar shear stress and flexural strength was carried out according to JIS-K-6911, the measurement of the former being performed by the short beam method under the condition of span/test piece thickness of 5.5; and the measurement of the latter being performed using the three-points bending method under the condition of span/test piece thickness of 20.

Table 2

|  |  | Interlaminar shear stress (kg/mm$^2$) | Flexural strength (kg/mm$^2$) | Strand tensile strength (kg/mm$^2$) |
|---|---|---|---|---|
| Present invention | A | 7.0 | 140 | 293 |
|  | C | 7.3 | 145 | 292 |
|  | D | 7.5 | 150 | 288 |
| Comparative examples | F | 5.7 | 125 | 289 |
|  | untreated | 5.5 | 123 | 290 |

From Table 2, it will be clearly understood that, by employing the treatment of the present invention, the strength of the thus-obtained carbon fibers is not lowered and the physical properties, especially the interlaminar shear stress, of the composite material produced with said carbon fibers are improved.

The sample carbon fibers shown by A, C and D did not cause any trouble due to disorder of the fiber bundle and had an excellent bundling ability, in addition to moderate flexibility. Therefore, there was neither filament breakage nor generation of fluffs at the time of the pressure shaping operation, so that not only the operation has become easy but also it has become possible to obtain shaped laminates (one-direction reinforced laminates) which are uniform and contain few voids. It will be obvious that this bundling ability-improving effect contributes greatly to the improvement in the physical properties, such as interlaminar shear stress, of the composite material.

EXAMPLE 2

The preparation of Sample C in Example 1 was repeated, however this time with the difference that acrylic acid was used in place of methyl acrylate. The amount of acrylic acid was 0.05, 1.0 and 6.0, and thus three kinds of one-direction reinforced laminates were made. The interlaminar shear stress of the laminates was 5.5, 7.2 and 5.6 kg/mm$^2$, respectively. From the evaluation of this physical property, it will be understood that the amounts of vinyl monomer within the range recommended in the present invention produce desirable results.

EXAMPLE 3

The preparation of Sample D in Example 1 was repeated, however this time using vinylpyrrolidone (1.0 volume %) as the vinyl monomer instead of methyl acrylate, to produce a one-direction reinforced laminate. The interlaminar shear stress of the laminate was 7.0 kg/mm$^2$.

The carbon fibers produced with vinylpyrrolidone did not show any troubles due to disorder of the fiber bundle and had an excellent bundling ability.

What we claim is:

1. A method of treating carbon fibers characterized by supplying carbon fibers into an aqueous electrolytic solution comprising a vinyl monomer, said carbon fibers being negatively charged so that they act as the cathode thereby causing a polymerization reaction to occur on the surface of said carbon fibers uniformly covering them with the polymerization product of said polymerization reaction.

2. The treating method as claimed in claim 1 wherein the starting material of the carbon fibers is acrylic fibers.

3. The treating method as claimed in claim 1 wherein the amount of vinyl monomer is 0.1 to 5 volume % based on the total volume of the electrolytic solution.

4. The treating method as claimed in claim 1 wherein a hydroperoxide compound is added to the electrolytic solution.

5. The treating method as claimed in claim 4 wherein the hydroperoxide compound is hydrogen peroxide.

6. The treating method as claimed in claim 4 wherein the amount of the hydroperoxide compound is 0.1 to 20 weight % based on the total weight of the electrolytic solution.

7. The treating method as claimed in claim 1 wherein said polymerization reaction is carried out for a period of time up to 120 seconds.

8. The treating method as claimed in claim 1 or claim 7 wherein said polymerization reaction is carried out for a period of time from 20 to 100 seconds.

9. The treating method as claimed in claim 1 wherein the current density at which said polymerization reaction is carried out is above 1 A/m$^2$.

10. The treating method as claimed in claim 1 or claim 9 wherein the current density at which said polymerization reaction is carried out is from 5 to 30 A/m$^2$.

* * * * *